United States Patent
Gangi et al.

(10) Patent No.: US 11,228,602 B2
(45) Date of Patent: Jan. 18, 2022

(54) IN-VEHICLE NETWORK SYSTEM

(71) Applicants: TOYOTA JIDOSHA KABUSHIKI KAISHA, Toyota (JP); DENSO CORPORATION, Kariya (JP)

(72) Inventors: Serina Gangi, Toyota (JP); Junya Kobayashi, Toyota (JP); Kazuo Kato, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 239 days.

(21) Appl. No.: 15/873,552

(22) Filed: Jan. 17, 2018

(65) Prior Publication Data
US 2018/0212977 A1  Jul. 26, 2018

(30) Foreign Application Priority Data
Jan. 25, 2017  (JP) .............................. JP2017-011621

(51) Int. Cl.
| | | |
|---|---|---|
| *H04L 29/06* | (2006.01) | |
| *H04L 9/08* | (2006.01) | |
| *H04L 9/32* | (2006.01) | |
| *H04L 29/08* | (2006.01) | |
| *H04W 4/48* | (2018.01) | |

(52) U.S. Cl.
CPC .......... *H04L 63/123* (2013.01); *H04L 9/0822* (2013.01); *H04L 9/3226* (2013.01); *H04L 9/3271* (2013.01); *H04L 63/062* (2013.01); *H04L 67/12* (2013.01); *H04W 4/48* (2018.02); *H04L 2209/84* (2013.01); *H04L 2463/062* (2013.01)

(58) Field of Classification Search
CPC ..... H04L 63/123; H04L 9/3226; H04L 67/12; H04L 63/062; H04W 4/48
USPC .......................................................... 713/168
See application file for complete search history.

(56) References Cited

U.S. PATENT DOCUMENTS 9,036,509 B1 * 5/2015 Addepalli ......... H04W 28/0215
                                                         370/259
9,231,936 B1 * 1/2016 Wang ...................... H04L 63/08
(Continued)

FOREIGN PATENT DOCUMENTS

JP    2004023237 A    1/2004
JP    2005341528 A    12/2005
(Continued)

*Primary Examiner* — Dereena T Cattungal
(74) *Attorney, Agent, or Firm* — Hunton Andrews Kurth LLP

(57) ABSTRACT

An in-vehicle network system includes one first node and a plurality of second nodes. The first node is configured to transmit predetermined data to the respective second nodes, and transmit verification data for verifying whether the predetermined data has been normally received by the second nodes to the second nodes when the predetermined data has been transmitted to the second node. Each of the second nodes is configured to receive the predetermined data transmitted from the first node, receive the verification data transmitted from the first node, verify whether the received predetermined data has been normally received based on the received predetermined data and the received verification data, and transmit a verification result to the first node.

13 Claims, 4 Drawing Sheets

(56) References Cited

U.S. PATENT DOCUMENTS

| | | | |
|---|---|---|---|
| 2004/0158533 A1* | 8/2004 | Messick | H04L 63/0428 705/75 |
| 2006/0115085 A1* | 6/2006 | Iwamura | H04L 9/0822 380/259 |
| 2011/0047630 A1* | 2/2011 | Cheng | H04L 9/3234 726/34 |
| 2011/0083161 A1 | 4/2011 | Ishida et al. | |
| 2012/0179902 A1 | 7/2012 | Noda | |
| 2015/0005991 A1* | 1/2015 | Willoughby | H04L 12/417 701/3 |
| 2015/0020152 A1* | 1/2015 | Litichever | H04L 12/40143 726/1 |
| 2015/0089236 A1* | 3/2015 | Han | H04L 9/3242 713/181 |
| 2015/0334554 A1* | 11/2015 | Song | H04W 4/70 455/558 |
| 2015/0372975 A1* | 12/2015 | Moriya | B61L 15/0018 726/12 |
| 2016/0205194 A1* | 7/2016 | Kishikawa | H04L 9/3242 726/1 |
| 2016/0219051 A1* | 7/2016 | Morita | H04L 63/0876 |
| 2016/0315766 A1* | 10/2016 | Ujiie | H04L 9/083 |
| 2016/0352388 A1* | 12/2016 | Lane | H04B 3/54 |
| 2017/0109521 A1* | 4/2017 | Ujiie | H04L 12/40 |
| 2017/0134164 A1* | 5/2017 | Haga | G06F 21/572 |
| 2017/0139795 A1* | 5/2017 | Komano | H04L 63/08 |
| 2019/0173862 A1* | 6/2019 | Kim | H04L 63/062 |
| 2019/0288849 A1* | 9/2019 | Ma | H04L 12/66 |

FOREIGN PATENT DOCUMENTS

| | | |
|---|---|---|
| JP | 2010136286 A | 6/2010 |
| JP | 2010245935 A | 10/2010 |
| JP | 2017092807 A | 5/2017 |
| WO | 2009-147734 A1 | 12/2009 |
| WO | 2011034196 A1 | 3/2011 |

* cited by examiner

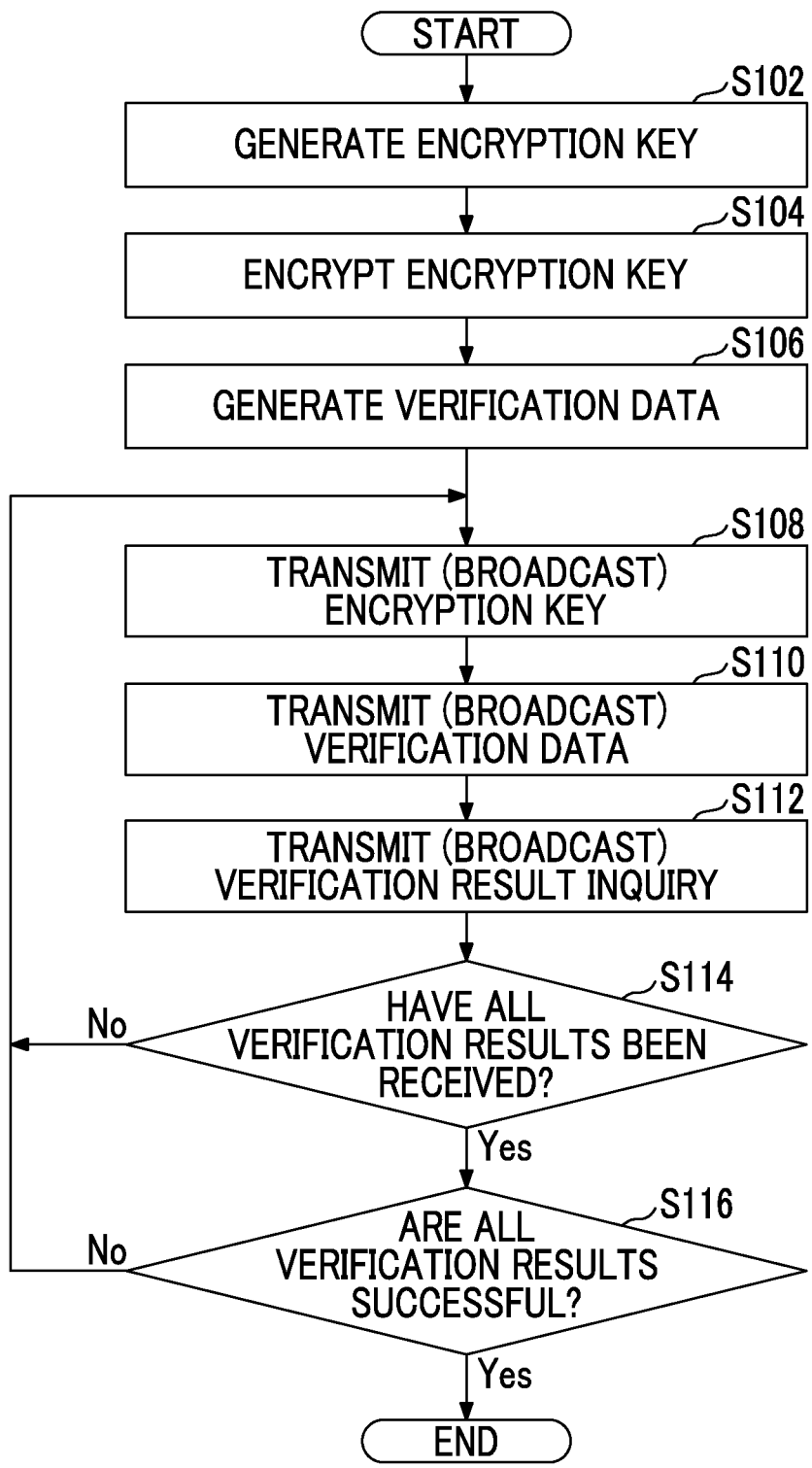

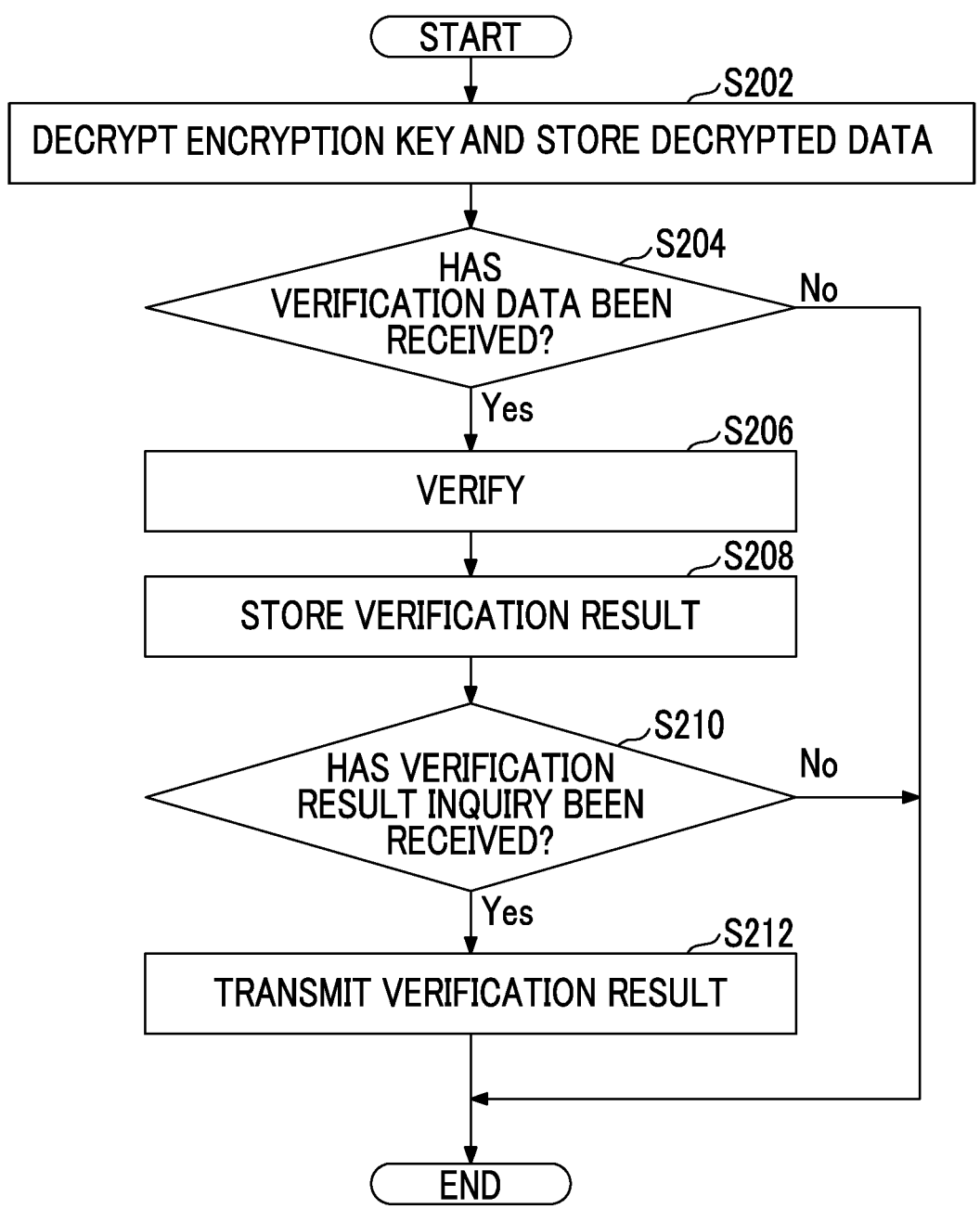

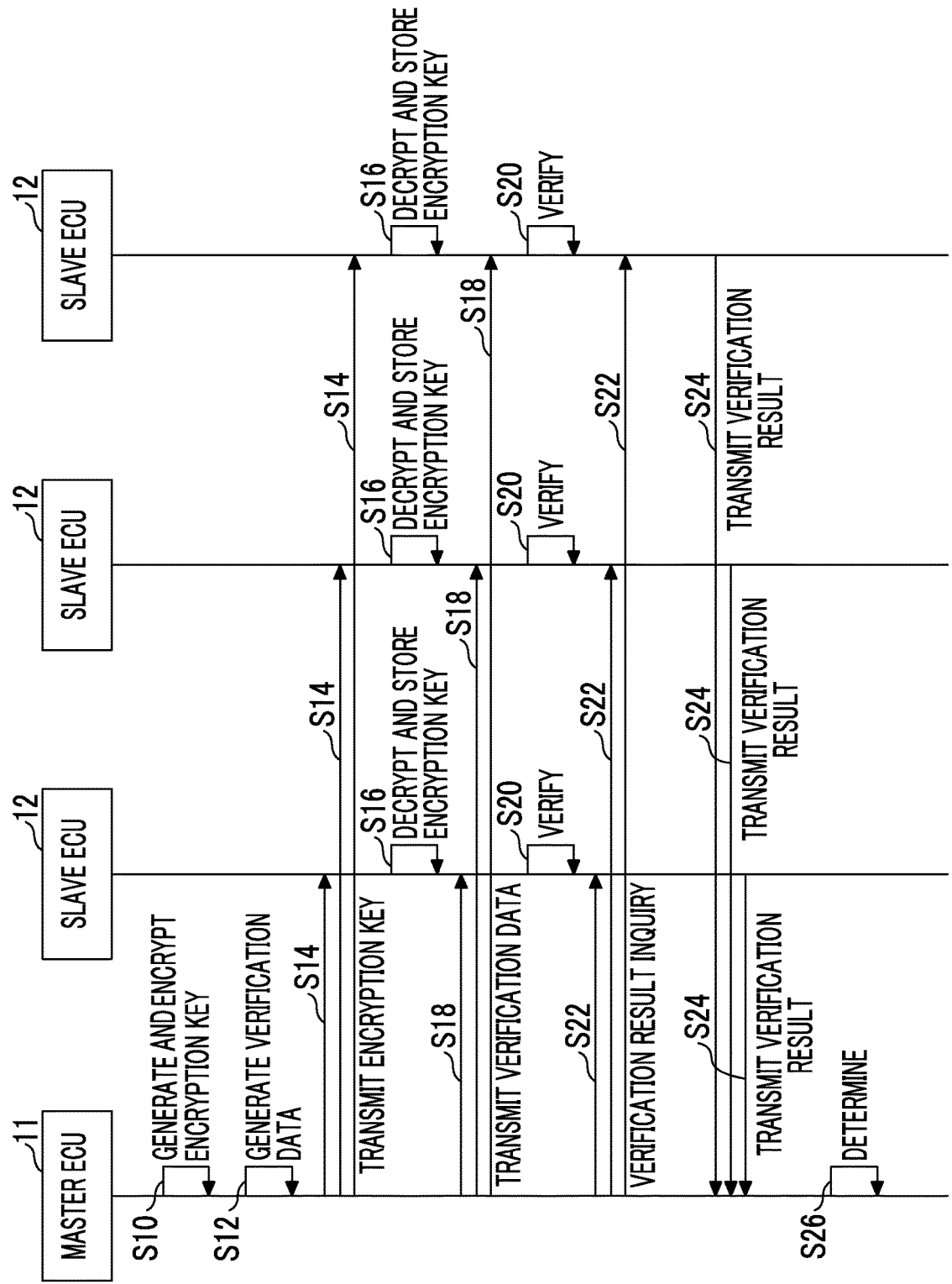

IN-VEHICLE NETWORK SYSTEM

INCORPORATION BY REFERENCE

The disclosure of Japanese Patent Application No. 2017-011621 filed on Jan. 25, 2017 including the specification, drawings and abstract is incorporated herein by reference in its entirety.

BACKGROUND

1. Technical Field

The present disclosure relates to an in-vehicle network system.

2. Description of Related Art

In the related art, as a scheme in which one node verifies (authenticates) validity of another node, a scheme in which one node verifies (authenticates) validity of another node based on verification data transmitted from the other node and verification data generated by the one node is known (for example, see WO 2009/147734).

SUMMARY

Incidentally, when data is transmitted from one node to another node, the one node may verify whether the other node has normally received the data.

However, as in verification as to the validity of the node described above, when the one node verifies whether the other node has normally received the data based on the verification data transmitted from the other node and the verification data generated by the one node, it is likely to take a relatively long time to complete the verification. For example, when there is a plurality of other nodes that is a verification target, one node needs to sequentially verify the other respective nodes. Therefore, it takes time to complete the verification, which is likely to affect other processes that are performed in the one node.

The present disclosure provides an in-vehicle network system capable of further shortening a time needed for verification as to whether data transmitted from a certain node to a plurality of nodes has been normally received by the respective nodes.

An aspect of the present disclosure relates to an in-vehicle network system including one first node, and a plurality of second nodes. The first node is configured to transmit predetermined data to the respective second nodes, and transmit verification data for verifying whether the predetermined data has been normally received by the second nodes to the second nodes when the predetermined data has been transmitted to the second nodes. Each of the second nodes is configured to receive the predetermined data transmitted from the first node, receive the verification data transmitted from the first node, verify whether the received predetermined data has been normally received based on the received predetermined data and the received verification data, and transmit a verification result to the first node.

According to the aspect of the present disclosure, when the predetermined data is transmitted from the first node to the second nodes, the verifications as to whether the predetermined data has been normally received are performed in parallel by the respective second nodes (verification units), and verification results are transmitted from the respective second nodes to the first node. Therefore, it is possible to further shorten a time needed for verification as compared with a case where the first node sequentially performs verifications on the respective second nodes that are verification targets.

With the in-vehicle network system according to the aspect of the present disclosure, it is possible to provide an in-vehicle network system capable of further shortening a time needed for verification as to whether data transmitted from a certain node to a plurality of nodes has been normally received by the respective nodes.

BRIEF DESCRIPTION OF THE DRAWINGS

Features, advantages, and technical and industrial significance of representation of the disclosure will be described below with reference to the accompanying drawings, in which like numerals denote like elements, and relates:

FIG. 2 is a flowchart schematically illustrating an example of a process in a master node;

FIG. 3 is a flowchart schematically illustrating an example of a process in a slave node; and FIG. 4 is a sequence diagram illustrating an example of a process in an in-vehicle network.

DETAILED DESCRIPTION OF EMBODIMENTS

Figure 1:
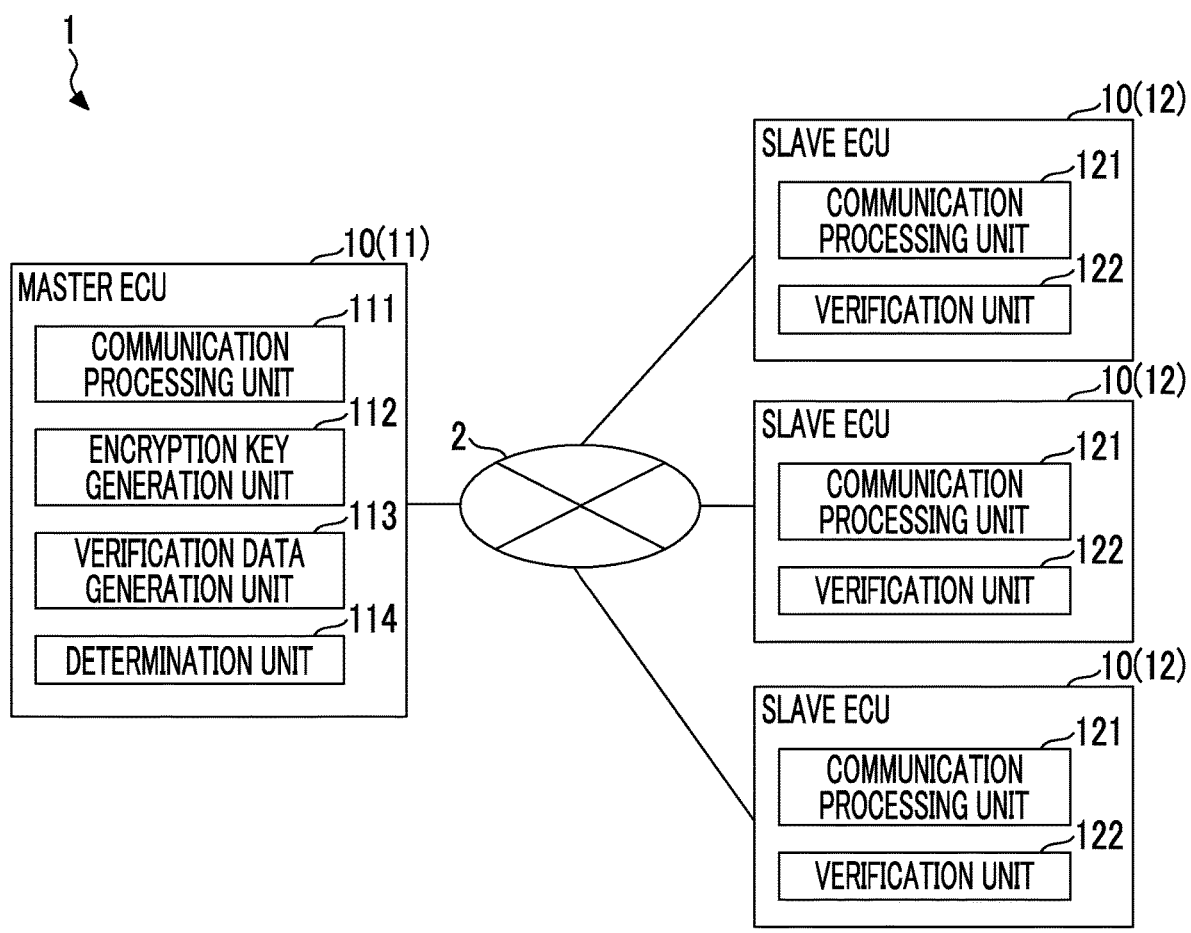
FIG. 1 is a block diagram illustrating an example of a configuration of an in-vehicle network system.

Hereinafter, modes for carrying out the disclosure will be described with reference to the drawings.

First, a configuration of an in-vehicle network system 1 according to this embodiment will be described with reference to FIG. 1.

FIG. 1 is a block diagram schematically illustrating an example of a configuration of the in-vehicle network system 1. The in-vehicle network system 1 is mounted on an arbitrary vehicle, and includes a plurality of (four in this embodiment) electronic control units (ECUs) 10 capable of performing communication with each other over a network 2 based on a predetermined communication protocol (for example, controller area network (CAN), a local interconnect network (LIN), or Ethernet (registered trademark)). Hereinafter, description will be given on the premise that in the network 2, the ECUs 10 perform communication with each other based on the Ethernet protocol.

Each of a plurality of ECUs 10 is an electronic control unit that performs various processes regarding predetermined functions. In the ECU 10, the predetermined function may be realized by arbitrary hardware, arbitrary hardware software, or a combination thereof. The ECU 10 may mainly include a microcomputer including a CPU, a RAM, a ROM, an I/O, and the like. The ECUs 10 include one master ECU 11 and a plurality of (three in this embodiment) slave ECUs 12 in a master/slave scheme.

The master ECU 11 (an example of a first node) is a gateway ECU (an example of a gateway device) that relays communication with a network (for example, another local network mounted on the same vehicle or a wireless network outside the vehicle) outside the network 2. The master ECU 11 includes, for example, a communication processing unit 111, an encryption key generation unit 112, a verification data generation unit 113, and a determination unit 114 as functional units that are realized by executing one or more programs on a CPU.

The communication processing unit 111 controls a predetermined interface (for example, an Ethernet communication IC) that is provided in the master ECU 11, and performs transmission and reception of various signals (a control signal, an information signal, and the like) to and from the other ECU 10 (slave ECU 12).

The encryption key generation unit 112 generates an encryption key for performing authentication of a message that is transmitted and received to and from the ECUs 10 (the master ECU 11 and the slave ECU 12). The encryption key generation unit 112 generates the encryption key at a predetermined timing, such as at predetermined cycles or at a time when a command from the outside such as a diagnostic tool connected to the vehicle or a remote server is received, and performs encryption in an aspect allowing decryption in the slave ECU 12 (for example, an aspect allowing the decryption with an encryption key as an initial value or a previously received encryption key). The encryption key generation unit 112 sends a transmission request to the communication processing unit 111 and simultaneously transmits (broadcasts) encrypted data of the encryption key to the slave ECUs 12.

The verification data generation unit 113 generates data (verification data) for verifying whether the data of encryption key has been normally received by each of the slave ECUs 12 that are transmission destinations of the encryption key. For example, the verification data generation unit 113 may generate data including a random number that is generated arbitrarily and a random number encrypted in an aspect allowing decryption with the encryption key transmitted to the slave ECU 12 as verification data. The verification data generation unit 113 transmits a transmission request to the communication processing unit 111, and simultaneously transmits (broadcasts) the generated verification data to the slave ECUs 12.

The determination unit 114 sends a transmission request to the communication processing unit 111 and transmits to the respective slave ECUs 12 an inquiry about a verification result as to whether the data of the encryption key has been normally received. Based on the verification result returned from the respective slave ECUs 12, the determination unit 114 determines whether the data of encryption key has been normally received by all of the slave ECUs 12.

The slave ECU 12 (an example of a second node) is an electronic control unit that controls various in-vehicle devices (for example, a driving system device such as an engine, a power steering device, or a transmission, or an information system device such as an audio device or a navigation device). The slave ECU 12 includes, for example, a communication processing unit 121 and a verification unit 122 as functional units that are realized by executing one or more programs on the CPU.

The communication processing unit 121 controls a predetermined interface (for example, an Ethernet communication IC) provided in the slave ECU 12, and performs transmission and reception of various signals (for example, a control signal or an information signal) to and from the other ECU 10.

Based on the data of the encryption key and the verification data from the master ECU 11 received by the communication processing unit 121, the verification unit 122 verifies whether the data of the encryption key has been normally received. For example, the verification unit 122 compares a random number obtained by decrypting the encrypted random number included in the verification data with the encryption key with the unencrypted random number included in the verification data, and determines that the data of the encryption key has been normally received (reception success) when the random numbers match. When the random numbers do not match, the verification unit 122 determines that the data of the encryption key has not been normally received (reception failure). The verification unit 122 sends a transmission request to the communication processing unit 121, and transmits a verification result to the master ECU 11.

Next, a process flow in the master ECU 11 will be described with reference to FIG. 2.

FIG. 2 is a flowchart schematically illustrating an example of a process in the master ECU 11.

In step S102, the encryption key generation unit 112 generates an encryption key.

In step S104, the encryption key generation unit 112 encrypts the generated encryption key.

In step S106, the verification data generation unit 113 generates verification data.

In step S108, the communication processing unit 111 broadcasts the encrypted data of encryption key to all the slave ECUs 12 in response to the transmission request from the encryption key generation unit 112.

In step S110, the communication processing unit 111 broadcasts the verification data to all the slave ECUs 12 in response to the transmission request from the verification data generation unit 113.

In step S112, the communication processing unit 111 broadcasts an inquiry about the verification result to the slave ECUs 12 in response to the transmission request from the determination unit 114.

The verification result may be returned from the slave ECU 12 to the master ECU 11 without inquiry from the master ECU 11, that is, automatically. In this case, step S112 may be omitted.

In step S114, the determination unit 114 determines whether the verification results from all the slave ECUs 12 have been received by the communication processing unit 111 within a predetermined time from the transmission of the inquiry. The predetermined time may be set as a time sufficiently longer than a maximum time needed to receive the verification results from all the slave ECUs 12. When the verification results from all the slave ECUs 12 have been received by the communication processing unit 111, the determination unit 114 proceeds to step S116, and otherwise, the determination unit 114 returns to step S108 and repeats the processes of steps S108 to S114.

When occurrence of a communication failure or the like is recognized, the master ECU 11 (the determination unit 114) may resume the processes of steps S108 to S114 after waiting for the communication failure to be solved.

In step S116, the determination unit 114 determines whether all the verification results received from the slave ECUs 12 by the communication processing unit 111 are "reception success". When all the verification results are "reception success", the determination unit 114 ends the current process. Otherwise, the determination unit 114 returns to step S108 to repeat the processes of steps S108 to S116.

Next, a process flow in the slave ECU 12 will be described with reference to FIG. 3.

FIG. 3 is a flowchart schematically illustrating an example of a process of the slave ECU 12. In the process according to this flowchart, when the communication processing unit 121 receives the data of encryption key from the master ECU 11, execution is started.

In step S202, the verification unit 122 acquires the data of the encryption key received by the communication processing unit 121, decrypts the data of the encryption key, and stores the decrypted data of encryption key in an internal memory (not illustrated) such as an electrically erasable programmable read-only memory (EEPROM) of the slave ECU 12.

In step S204, the verification unit 122 determines whether the verification data has been received from the master ECU 11 by the communication processing unit 121 within a predetermined period of time from the reception of the data of encryption key. The predetermined time may be set as a time sufficiently longer than a maximum time needed to receive the verification data from the master ECU 11. When the verification data is received from the master ECU 11 by the communication processing unit 121, the verification unit 122 proceeds to step S206. Otherwise, the verification unit 122 ends the current process.

In step S206, the verification unit 122 verifies whether the data of encryption key has been normally received based on the (decrypted) data of the encryption key and the verification data from the master ECU 11 received by the communication processing unit 121.

In step S208, the verification unit 122 holds the verification result ("reception success" or "reception failure") in a buffer or the like on a RAM of the slave ECU 12.

In step S210, the verification unit 122 determines whether an inquiry about the verification result from the master ECU 11 has been received by the communication processing unit 121 within a predetermined period of time from the reception of the verification data. The predetermined time may be set as a time sufficiently longer than a maximum time needed to receive the inquiry about the verification result from the master ECU 11. When the inquiry about the verification result is received from the master ECU 11 by the communication processing unit 121, the verification unit 122 proceeds to step S212. Otherwise, the verification unit 122 ends the current process.

As described above, the verification result may be returned from the slave ECU 12 to the master ECU 11 without the inquiry from the master ECU 11, that is, automatically. In this case, step S210 is omitted.

In step S212, the communication processing unit 121 transmits data of the verification result held in step S208 to the master ECU 11 in response to the transmission request from the verification unit 122.

Next, an operation of the entire in-vehicle network system 1 based on the process flows of FIGS. 2 and 3 will be described with reference to FIG. 4.

FIG. 4 is a sequence diagram illustrating an example of the operation of the in-vehicle network system 1.

In step S10, the master ECU 11 (the encryption key generation unit 112) generates an encryption key and encrypts the encryption key (steps S102 and S104 in FIG. 2).

In step S12, the master ECU 11 (the verification data generation unit 113) generates verification data (step S106 in FIG. 2).

In step S14, the master ECU 11 (the communication processing unit 111) broadcasts the encrypted data of encryption key to all the slave ECUs 12 (step S108 in FIG. 2).

In step S16, the slave ECU 12 (the verification unit 122) decrypts the data of the encryption key received from the master ECU 11 and also stores the decrypted data of the encryption key in the internal memory (not illustrated) such as the EEPROM of the slave ECU 12 (step S202 in FIG. 3).

On the other hand, in step S18, the master ECU 11 (the communication processing unit 111) broadcasts the verification data to all the slave ECUs 12 after transmitting the data of the encryption key (step S110 in FIG. 2).

In step S20, the slave ECU 12 (the verification unit 122) verifies whether the data of encryption key has been normally received based on the (decrypted) data of the encryption key and the verification data from the master ECU 11 received by the communication processing unit 121 (step S206 in FIG. 3).

On the other hand, in step S22, the master ECU 11 (the communication processing unit 111) broadcasts an inquiry about the verification result to all the slave ECUs 12 after transmitting the verification data (step S112 in FIG. 2).

In step S24, the slave ECU 12 (the communication processing unit 121) transmits data of the verification result to the master ECU 11 in response to the inquiry about the verification result from the master ECU 11 (step S212 in FIG. 3).

In step S26, the master ECU 11 (the determination unit 124) confirms all the verification results received from the slave ECUs 12 by the communication processing unit 111, and determines whether the data of encryption key has been normally received by all the slave ECUs 12 (step S116 in FIG. 2).

As described above, in this embodiment, the communication processing unit 111 of the master ECU 11 (the first node) transmits predetermined data (the data of the encryption key) to each of the slave ECUs 12 (second nodes) and transmits the verification data for verifying whether the predetermined data has been normally received by the slave ECUs 12 to the slave ECUs 12. Further, the communication processing units 121 of the slave ECUs 12 respectively receive the predetermined data transmitted from the master ECU 11 and receive the verification data transmitted from the master ECU 11. The respective verification units 122 of the slave ECUs 12 verify whether the predetermined data has been normally received based on the received predetermined data and the received verification data, and the respective communication processing units 121 of the slave ECUs 12 transmit verification results to the master ECU 11. Accordingly, when the predetermined data is transmitted from the master ECU 11 to the slave ECUs 12, the verifications of whether the predetermined data have been normally received are performed in parallel in the respective slave ECUs 12 (the verification units 122), and the verification results are transmitted from the respective slave ECUs 12 (communication processing units 121) to the master ECU 11. Therefore, it is possible to further shorten a time needed for verification as compared with a case where the master ECU 11 sequentially performs verifications of the respective slave ECUs 12 that are verification targets.

In this embodiment, the communication processing unit 111 of the master ECU 11 simultaneously transmits the same data as the predetermined data to the respective slave ECUs 12. Therefore, when the same data is simultaneously transmitted from the master ECU 11 to the respective slave ECUs 12, it is possible to further shorten the time needed for verification as to whether the same data has been normally received by the respective slave ECUs 12.

In this embodiment, the same data transmitted from the master ECU 11 is the data of the encryption key for performing message authentication between the master ECU 11 and the slave ECUs 12. Accordingly, when the encryption key for performing the message authentication is shared in the same network (that is, the network 2) to which the master ECU 11 and the slave ECUs 12 belong, it is possible to further shorten the time needed for verification as to whether the data of the encryption key has been normally received by the respective slave ECUs 12.

In this embodiment, the master ECU 11 is, for example, a gateway ECU (gateway device) that relays communication with an external network. Accordingly, since the verifications are performed in parallel by the respective slave ECUs 12, a processing load of the gateway device (the master ECU 11) can be further reduced, and an influence on communication in a network including the gateway device and the slave ECUs 12 (that is, in the network 2) or communication with the outside can be further suppressed.

In this embodiment, among the ECUs 10, a node that is a transmission source of the predetermined data (the data of the encryption key) is the master node (the master ECU 11), and the nodes that are transmission destinations of the predetermined data are slave nodes (the slave ECUs 12). Accordingly, in a case where the master/slave scheme in which one master node (the master ECU 11) controls operations (communications) of a plurality of slave nodes (the slave ECUs 12) is adopted, a processing load of the master node can be further suppressed since the verifications are performed in parallel in the respective slave nodes.

Although the master ECU 11 simultaneously transmits the data of the encryption key used for message authentication to the respective slave ECUs 12 in this embodiment, the master ECU 11 may simultaneously transmit data other than the encryption key to the respective slave ECUs 12. For example, when one of the ECUs 10 fails and is replaced, data of destination information (information indicating a destination vehicle on which the ECUs 10 are mounted) may be simultaneously transmitted from the master ECU 11 to the respective slave ECUs 12 according to a request from an external tool connected to the master ECU 11. In such a case, the same verification method as in the above embodiment may be executed. Accordingly, in a case where a control specification regarding a predetermined function in the slave ECU 12 differs according to a destination of the vehicle, the slave ECU 12 can recognize the destination of the vehicle from data of the destination information transmitted from the master ECU 11 when the slave ECU 12 is replaced due to failure or the like. In this case, by the respective slave ECUs 12 executing the verification as to whether the simultaneously transmitted destination information has been normally received, the master ECU 11 can verify whether the destination information has been normally received by all the slave ECUs 12 in a shorter time.

Although the master ECU 11 and the slave ECUs 12 execute the above-described verification method when the master ECU 11 simultaneously transmits the same data to the respective slave ECUs 12 in the embodiment, the same verification method may be adopted even when content of data that is transmitted to the respective slave ECUs 12 or a transmission timing is different. In this case, when predetermined data is transmitted to the slave ECU 12, the master ECU 11 (the communication processing unit 111) transmits the verification data for verifying whether the predetermined data has been normally received by the slave ECU 12 to the slave ECU 12. Accordingly, the verification is performed by the respective slave ECUs 12 that are transmission destinations regardless of the content of data that is transmitted from the master ECU 11 to the respective slave ECUs 12 or the transmission timing. Accordingly, it is possible to similarly shorten the time needed for verification and reduce the processing load in the master ECU 11 when the master ECU 11 verifies whether all of various types of data transmitted to the slave ECUs 12 have been normally received.

Although the master/slave scheme is adopted in the ECUs 10, the transmission source of the predetermined data (the data of the encryption key) is the master, and the transmission destination is the slave nodes in this embodiment, one of the ECUs 10 may be the transmission source and the other ECUs 10 may be the transmission destinations. In this case, by adopting the same verification method in which the other respective ECUs 10 perform the verification in parallel, it is possible to verify whether the predetermined data has been normally received by the other respective ECUs 10 that are transmission destinations in a shorter time.

The modes for carrying out the present disclosure have been described in detail above, but the present disclosure is not limited to such specific embodiments, and various modifications and changes can be performed within the scope of the gist of the present disclosure described in the claims.

In the in-vehicle network system according to the aspect of the present disclosure, the first node may be configured to simultaneously transmit the same data, as the predetermined data, to the respective second nodes.

According to the embodiment of the present disclosure, when the same data is simultaneously transmitted from the first node to the respective second nodes, it is possible to further shorten a time needed for verification as to whether the same data has been normally received by the respective second nodes.

In the in-vehicle network system according to the aspect of the present disclosure, the same data may be the data of the encryption key for performing message authentication between the first node and the second nodes.

According to the embodiment of the present disclosure, when the encryption key for performing message authentication is shared in the same network to which the first node and the second nodes belong, it is possible to further shorten the time needed for verification as to whether the data of the encryption key has been normally received by the respective second nodes.

In the in-vehicle network system according to the aspect of the present disclosure, the first node may be configured to transmit the verification data to the respective second nodes, and then, simultaneously transmit an inquiry about the verification result to the second nodes. Each of the second nodes may be configured to transmit the verification result to the first node in response to the inquiry about the verification result.

In the in-vehicle network system according to the aspect of the present disclosure, the first node may be a gateway device configured to relay communication with an external network.

According to the embodiment of the present disclosure, the verifications are performed in parallel in the respective second nodes. Therefore, a processing load of the gateway device (the first node) can be further reduced, and an influence on communication in a network including the gateway device and the second nodes or communication with the outside can be further suppressed.

In the in-vehicle network system according to the aspect of the present disclosure, the first node may be configured as a master node, and the second node may be configured as a slave node.

According to the embodiment, in a case where a master/slave scheme in which one master node (first node) controls operations (communications) of a plurality of slave nodes (second nodes) is adopted, a processing load of the master node can be further suppressed since the verification are performed in parallel in the respective slave nodes.

What is claimed is:

1. An in-vehicle network system for reducing communication loads between nodes comprising:
one first node; and
a plurality of second nodes, wherein
the first node is configured to
transmit predetermined data to the respective second nodes, wherein the predetermined data is a data of an encryption key for performing message authentication between the first node and the second nodes, and
after transmitting the predetermined data to the second nodes, transmit, to the second nodes, verification data for verifying whether the predetermined data has been normally received by the second nodes, the verification data being data including an unencrypted random number that is generated arbitrarily and an encrypted random number encrypted in an aspect allowing decryption with the predetermined data; and
each of the second nodes is configured to
receive the predetermined data transmitted from the first node,
receive the verification data transmitted from the first node,
verify whether the received predetermined data has been normally received based on the received predetermined data and the received verification data, and
transmit a verification result to the first node, wherein
the first node is further configured to determine whether the verification result transmitted from the each of the second nodes is received within a time longer than a maximum time needed to receive the verification result from the each of the second nodes, and
each of the second nodes is further configured to compare an unencrypted random number included in the verification data with a random number obtained by decrypting the encrypted random number included in the verification data with the encryption key, and determine that the data of the encryption key has been normally received when the random number obtained by decrypting the encrypted random number included in the verification data matches with the unencrypted random number included in the verification data.

2. The in-vehicle network system according to claim 1, wherein the first node is configured to simultaneously transmit the same data, as the predetermined data, to the respective second nodes.

3. The in-vehicle network system according to claim 2, wherein the same data is the data of the encryption key for performing message authentication between the first node and the second nodes.

4. The in-vehicle network system according to claim 3, wherein the first node is a gateway device configured to relay communication with an external network.

5. The in-vehicle network system according to claim 3, wherein:
the first node is configured as a master node; and
the second node is configured as a slave node.

6. The in-vehicle network system according to claim 2, wherein the first node is a gateway device configured to relay communication with an external network.

7. The in-vehicle network system according to claim 2, wherein:
the first node is configured as a master node; and
the second node is configured as a slave node.

8. The in-vehicle network system according to claim 1, wherein:
the first node is configured to transmit the verification data to the respective second nodes, and then, simultaneously transmit an inquiry about the verification result to the second nodes; and
each of the second nodes is configured to transmit the verification results to the first node in response to the inquiry about the verification result.

9. The in-vehicle network system according to claim 8, wherein the first node is a gateway device configured to relay communication with an external network.

10. The in-vehicle network system according to claim 8, wherein:
the first node is configured as a master node; and
the second node is configured as a slave node.

11. The in-vehicle network system according to claim 1, wherein the first node is a gateway device configured to relay communication with an external network.

12. The in-vehicle network system according to claim 11, wherein:
the first node is configured as a master node; and
the second node is configured as a slave node.

13. The in-vehicle network system according to claim 1, wherein:
the first node is configured as a master node; and
the second node is configured as a slave node.

* * * * *